(12) United States Patent
Sun et al.

(10) Patent No.: US 11,095,407 B2
(45) Date of Patent: Aug. 17, 2021

(54) SIGNAL PROCESSING METHOD, APPARATUS, AND SYSTEM

(71) Applicant: Huawei Technologies Co., Ltd., Shenzhen (CN)

(72) Inventors: Fanglin Sun, Shenzhen (CN); Cao Shi, Munich (DE); Zhong Pan, Shenzhen (CN); Jianping Tu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 405 days.

(21) Appl. No.: 15/813,426

(22) Filed: Nov. 15, 2017

(65) Prior Publication Data

US 2018/0069674 A1 Mar. 8, 2018

Related U.S. Application Data

(63) Continuation of application No. PCT/CN2015/079070, filed on May 15, 2015.

(51) Int. Cl.
*H04L 5/06* (2006.01)
*H04L 5/00* (2006.01)
(Continued)

(52) U.S. Cl.
CPC ............ *H04L 5/0048* (2013.01); *H04B 3/32* (2013.01); *H04L 5/001* (2013.01);
(Continued)

(58) Field of Classification Search
CPC ......... H04B 3/32; H04B 3/50; H04L 12/2878; H04L 43/00; H04L 5/001; H04L 5/0048
See application file for complete search history.

(56) References Cited

U.S. PATENT DOCUMENTS

2007/0047631 A1 3/2007 Bostoen et al.
2008/0267391 A1 10/2008 Du
(Continued)

FOREIGN PATENT DOCUMENTS

CN 1710985 A 12/2005
CN 101222242 A 7/2008
(Continued)

OTHER PUBLICATIONS

"Self-FEXT cancellation (vectoring) for use with VDSL2 transceivers", ITU-T G.993.5 (Jan. 2015), available from https://www.itu.int/rec/T-REC-G.993.5/en, Jan. 2015.*
(Continued)

*Primary Examiner* — Asad M Nawaz
*Assistant Examiner* — Zhaohui Yang
(74) *Attorney, Agent, or Firm* — Slater Matsil, LLP (57) ABSTRACT

Embodiments of the present invention provide a signal processing method, including: dividing a frequency band used to send a downlink synchronization symbol into at least two parts of frequency bands that do not overlap, where the two parts of frequency bands are a first frequency band and a second frequency band; alternately allocating frequencies in the first frequency band to a probe tone and a flag tone; and allocating all frequencies in the second frequency band to a probe tone; and modulating a downlink pilot sequence to probe tones in the first frequency band and the second frequency band, and sending the downlink pilot sequence to a peer device. The embodiments of the present invention further provide a signal processing apparatus and a network system.

20 Claims, 4 Drawing Sheets

(51) Int. Cl.
*H04L 12/26* (2006.01)
*H04B 3/32* (2006.01)
*H04L 12/28* (2006.01)
*H04M 11/06* (2006.01)
*H04B 3/50* (2006.01)

(52) U.S. Cl.
CPC .......... *H04L 12/2878* (2013.01); *H04L 43/00* (2013.01); *H04M 11/062* (2013.01); *H04B 3/50* (2013.01)

(56) References Cited

U.S. PATENT DOCUMENTS

| | | | |
|---|---|---|---|
| 2011/0058468 A1* | 3/2011 | Singh | H04M 3/304 370/201 |
| 2012/0114063 A1 | 5/2012 | Bo et al. | |
| 2014/0226454 A1 | 8/2014 | Lu et al. | |
| 2015/0295621 A1 | 10/2015 | Wang | |
| 2015/0295684 A1* | 10/2015 | Jin | H04L 5/006 370/390 |

FOREIGN PATENT DOCUMENTS

| | | |
|---|---|---|
| CN | 101237398 A | 8/2008 |
| CN | 101997796 A | 3/2011 |
| CN | 103229445 A | 7/2013 |
| CN | 103891155 A | 6/2014 |
| CN | 104247358 A | 12/2014 |
| WO | 0172081 A1 | 9/2000 |
| WO | 2014086293 A1 | 6/2014 |
| WO | 2014180792 A1 | 11/2014 |

OTHER PUBLICATIONS

"Very high speed digital subscriber line transceivers 2 (VDSL2)" ITU-T G.993.2, Jan. 2015, avail at https://www.itu.int/rec/T-REC-G.993.2.*

"Very high speed digital subscriber line transceivers 2 (VDSL2)" ITU-T, G.993.2, published Feb. 2006. available at https://www.itu.int/rec/T-REC-G.993.2-200602-S/en retrieved Aug. 6, 2020, (Year: 2006).*

Self-FEXT cancellation (vectoring) for use with VDSL2 transceivers, ITU-T G.993.5 (Jan. 2015) (Year: 2015).*

"Very high speed digital subscriber line transceivers 2 (VDSL2)", ITU-T G.993.2 (Jan. 2015) hereinafter G.993.2. excerpted Annex X and Y (Year: 2015).*

International Telecommunication Union, "Series G: Transmission Systems and Media, Digital Systems and Networks," Digital sections and digital line system—Metallic access networks; Self-FEXT cancellation (vectoring) or use with VDSL2 transceivers, ITU-T G.993.5 (Jan. 2015), 98 pages.

Maes, J. et al., "Pilot-Based Crosstalk Channel Estimation for Vector-Enabled VDSL Systems," 2010 44th Annual Conference on Information Sciences and Systems (CISS ), 2010, 6 pages.

* cited by examiner

SIGNAL PROCESSING METHOD, APPARATUS, AND SYSTEM

CROSS-REFERENCE TO RELATED APPLICATIONS

This application is a continuation of International Application No. PCT/CN2015/079070, filed on May 15, 2015, the disclosure of which is hereby incorporated by reference in its entirety.

TECHNICAL FIELD

The present invention relates to the field of data communications, and specifically, to a signal processing method, an apparatus, and a system.

BACKGROUND

Figure 1:
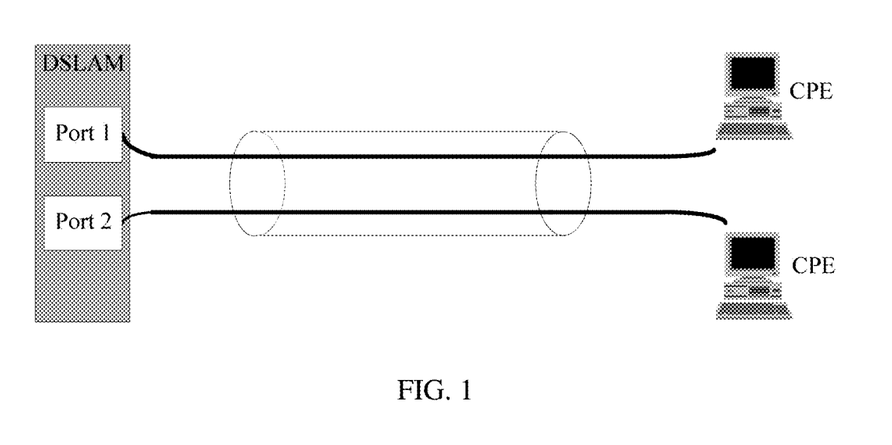
FIG. 1 is a schematic diagram of a connection relationship in a DSLAM system.

A digital subscriber line (DSL) technology is a high-speed data transmission technology in which transmission is performed by using a telephone twisted pair, such as an unshielded twisted pair (UTP). The DSL technology includes an asymmetric digital subscriber line (ADSL), a very-high-bit-rate digital subscriber line (VDSL), a very-high-bit-rate digital subscriber line 2 (VDSL2), a single-pair high-bit-rate digital subscriber line (SHDSL), and the like. A device that provides multi-path DSL access for customer premises equipment (CPE) is referred to as a DSL access multiplexer (DSLAM), and a connection relationship of a DSLAM system is shown in FIG. 1.

Currently, the industry has started to define and technically discuss a next-generation VDSL, to extend a spectrum of a maximum of 17.664 MHz of the original VDSL2 to at least 30 MHz. However, a high spectrum naturally causes high crosstalk on a line, and crosstalk in a high frequency band cannot be directly canceled by using a crosstalk cancellation method for the VDSL2. This seriously affects signal transmission on the line.

SUMMARY

Embodiments of the present invention provide a signal processing method, an apparatus, and a system, to improve system performance.

According to a first aspect, an embodiment of the present invention provides a signal processing method. The method includes dividing, by a network side device, a frequency band used to send a downlink synchronization symbol into at least two pails of frequency bands that do not overlap, where the two pails of frequency bands are a first frequency band and a second frequency band, and a lowest frequency in the second frequency band is higher than a highest frequency in the first frequency band. The method also includes alternately allocating frequencies in the first frequency band to a probe tone and a flag tone; and allocating all frequencies in the second frequency band to a probe tone. The method also includes modulating, by the network side device, a downlink pilot sequence to probe tones in the first frequency band and the second frequency band, and sending the downlink pilot sequence to a peer device.

In a first possible implementation of the first aspect, the alternately allocating frequencies in the first frequency band to a probe tone and a flag tone specifically includes: alternately allocating, according to a comb-shaped structure, the frequencies in the first frequency band to the probe tone and the flag tone.

In a second possible implementation of the first aspect, the network side device modulates the downlink pilot sequence to the probe tones in the first frequency band and the second frequency band and to the flag tone in the first frequency band in an initialization phase; and modulates the downlink pilot sequence to the probe tones in the first frequency band and the second frequency band in a data transmission phase.

With reference to the first aspect, the first possible implementation of the first aspect, or the second possible implementation of the first aspect, in a third possible implementation, ranges of the first frequency band and the second frequency band are fixedly set in a device, or determined after the network side device interacts and negotiates with the peer device in a handshake phase or the initialization phase.

With reference to the first aspect, the first possible implementation of the first aspect, or the second possible implementation of the first aspect, in a fourth possible implementation, the method further includes: receiving, by the network side device, a signal fed back by the peer device, where the signal fed back by the peer device reflects a signal received by the peer device on the probe tones in the first frequency band and the second frequency band.

With reference to the fourth possible implementation of the first aspect, in a fifth possible implementation, the signal fed back by the peer device is an error sample signal of the signal received by the peer device on the probe tones in the first frequency band and the second frequency band, or a signal that is obtained after frequency domain conversion is performed on the signal received on the probe tones in the first frequency band and the second frequency band.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, the frequency band used by the network side device to send the downlink synchronization symbol is a combination of frequency bands used to send the downlink synchronization symbol in two DSL modes with different frequency bands; and the highest frequency in the first frequency band is not higher than a highest frequency in an overlapped frequency band used to send the downlink synchronization symbol in the two DSL modes with different frequency bands.

According to a second aspect, an embodiment of the present invention further provides a signal processing method. The method includes dividing, by a user side device, a frequency band used to send an uplink synchronization symbol into at least two parts of frequency bands that do not overlap, where the two pails of frequency bands are a first frequency band and a second frequency band, and a lowest frequency in the second frequency band is higher than a highest frequency in the first frequency band. The method also includes alternately allocating frequencies in the first frequency band to a probe tone and a flag tone; and allocating all frequencies in the second frequency band to a probe tone. The method also includes modulating, by the user side device, an uplink pilot sequence to probe tones in the first frequency band and the second frequency band, and sending the uplink pilot sequence to a peer device.

In a first possible implementation of the second aspect, the user side device modulates the uplink pilot sequence to the probe tones in the first frequency band and the second frequency band and to the flag tone in the first frequency band in an initialization phase; and modulates the uplink pilot sequence to the probe tones in the first frequency band and the second frequency band in a data transmission phase.

With reference to the second aspect or the first possible implementation of the second aspect, in the second possible implementation of the second aspect, ranges of the first frequency band and the second frequency band are fixedly set in a device, or determined after the user side device interacts and negotiates with the peer device in a handshake phase or the initialization phase.

With reference to the second aspect, the first possible implementation of the second aspect, or the second possible implementation of the second aspect, in a third possible implementation of the second aspect, the frequency band used by the user side device to send the uplink synchronization symbol is a combination of frequency bands used to send the uplink synchronization symbol in two DSL modes with different frequency bands; and the highest frequency in the first frequency band is not higher than a highest frequency in an overlapped frequency band used to send the uplink synchronization symbol in the two DSL modes with different frequency bands.

According to a third aspect, an embodiment of the present invention provides a network side device, where the network side device includes a spectrum division module and a signal sending module. The spectrum division module is configured to: divide a frequency band used to send a downlink synchronization symbol into at least two pails of frequency bands that do not overlap, where the two pails of frequency bands are a first frequency band and a second frequency band, and a lowest frequency in the second frequency band is higher than a highest frequency in the first frequency band; alternately allocate frequencies in the first frequency band to a probe tone and a flag tone; and allocate all frequencies in the second frequency band to a probe tone. The signal sending module is configured to: modulate, by the network side device, a downlink pilot sequence to probe tones in the first frequency band and the second frequency band, and send the downlink pilot sequence to a peer device.

In a first possible implementation of the third aspect, that the spectrum division module alternately allocates the frequencies in the first frequency band to the probe tone and the flag tone specifically includes that: the spectrum division module alternately allocates, according to a comb-shaped structure, the frequencies in the first frequency band to the probe tone and the flag tone.

With reference to the third aspect or the first possible implementation of the third aspect, in a second possible implementation of the third aspect, the network side device further includes a signal receiving module, configured to receive a signal fed back by the peer device, where the signal reflects a signal received by the peer device on the probe tones in the first frequency band and the second frequency band.

With reference to the third aspect, the first possible implementation of the third aspect, or the second possible implementation of the third aspect, in a third possible implementation of the third aspect, the signal sending module modulates the downlink pilot sequence to the probe tones in the first frequency band and the second frequency band and to the flag tone in the first frequency band in an initialization phase; and modulates the downlink pilot sequence to the probe tones in the first frequency band and the second frequency band in a data transmission phase.

With reference to third possible implementation of the third aspect, in a fourth possible implementation of the third aspect, the network side device is a DSLAM, the spectrum division module is a processing chip in the DSLAM, and the signal sending module is a signal transmitter in the DSLAM.

With reference to the third aspect, the first possible implementation of the third aspect, the second possible implementation of the third aspect, the third possible implementation of the third aspect, or the fourth possible implementation of the third aspect, in a fifth possible implementation of the third aspect, the frequency band used to send the downlink synchronization symbol is a combination of frequency bands used to send the downlink synchronization symbol in two DSL modes with different frequency bands; and the highest frequency in the first frequency band is not higher than a highest frequency in an overlapped frequency band used to send the downlink synchronization symbol in the two DSL modes with different frequency bands.

According to a fourth aspect, an embodiment of the present invention provides a user side device, where the user side device includes a spectrum division module and a signal sending module, where the spectrum division module is configured to: divide a frequency band used to send an uplink synchronization symbol into at least two parts of frequency bands that do not overlap, where the two parts of frequency bands are a first frequency band and a second frequency band, and a lowest frequency in the second frequency band is higher than a highest frequency in the first frequency band; alternately allocate frequencies in the first frequency band to a probe tone and a flag tone; and allocate all frequencies in the second frequency band to a probe tone; and the signal sending module is configured to: modulate an uplink pilot sequence to probe tones in the first frequency band and the second frequency band, and send the uplink pilot sequence to a peer device.

In a first possible implementation of the fourth aspect, the signal sending module modulates the uplink pilot sequence to the probe tones in the first frequency band and the second frequency band and to the flag tone in the first frequency band in an initialization phase; and modulates the uplink pilot sequence to the probe tones in the first frequency band and the second frequency band in a data transmission phase.

With reference to the fourth aspect or the first possible implementation of the fourth aspect, in a second possible implementation of the fourth aspect, the user side device is customer premises equipment (CPE), the spectrum division module is a processing chip in the CPE, and the signal sending module is a signal transmitter in the CPE.

With reference to the fourth aspect, the first possible implementation of the fourth aspect, or the second possible implementation of the fourth aspect, in a third possible implementation of the fourth aspect, the frequency band used to send the uplink synchronization symbol is a combination of frequency bands used to send the uplink synchronization symbol in two DSL modes with different frequency bands; and the highest frequency in the first frequency band is not higher than a highest frequency in an overlapped frequency band used to send the uplink synchronization symbol in the two DSL modes with different frequency bands.

According to a fifth aspect, an embodiment of the present invention provides a network system, where the network system includes a network side device and a user side device, and the network side device and the user side device are connected by using a twisted pair. The network side device is the network side device described above; or the user side device is the user side device described above.

According to the solutions in the embodiments, the frequency band used to send a downlink synchronization symbol is divided into the at least two parts of frequency bands that do not overlap, where the lowest frequency in the second frequency band is higher than the highest frequency in the first frequency band. High frequency bands that are prone to interference are all allocated to probe tones, so as to increase density of the probe tones. In this way, the uplink or the downlink pilot sequence is modulated to the probe tones in the first frequency band and the second frequency band, and then the uplink or the downlink pilot sequence is sent to the peer device. This can ensure that the peer device can normally obtain a signal at each frequency in a high spectrum.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

To cancel crosstalk on a VDSL2 line, a to-be-sent signal may be pre-compensated on a network side (a CO side) according to a crosstalk parameter fed back by a user side (that is, a CPE side). This technology is referred to as vectoring processing. An apparatus for performing vectoring processing is a vectoring control entity (VCE) in a DSLAM. The VCE modulates a designated downlink pilot sequence to a probe tone of a downlink synchronization symbol in an initialization phase and a data transmission phase (Showtime phase). In addition to the probe tone, there is a flag tone, used to transmit a pilot sequence.

Figure 2:
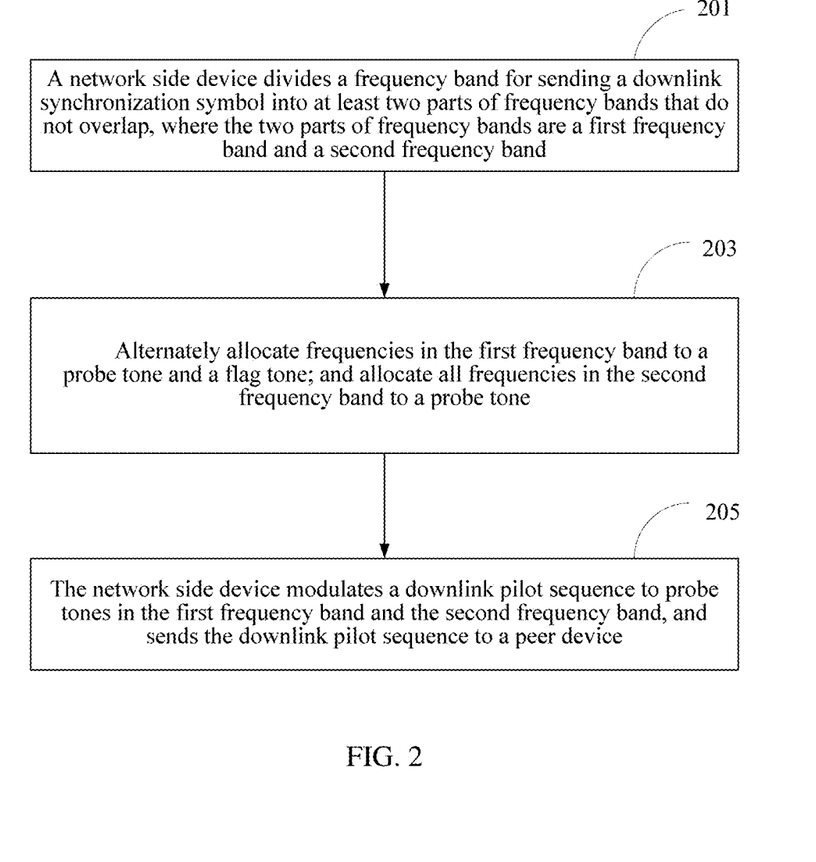
FIG. 2 is a schematic flowchart of a signal processing method according to an embodiment of the present invention.

An embodiment of the present invention provides a signal processing method. As shown in FIG. 2, the method includes the following steps.

Step 201: A network side device divides a frequency band used to send a downlink synchronization symbol into at least two parts of frequency bands that do not overlap, where the two parts of frequency bands are a first frequency band and a second frequency band, and a lowest frequency in the second frequency band is higher than a highest frequency in the first frequency band.

In an example, the frequency band used by the network side device to send the downlink synchronization symbol is 0 MHz to 35.328 MHz. 0 MHz to 35.328 MHz may be divided into two frequency bands. The highest frequency in the first frequency band is set to not higher than 17.664 MHz. The lowest frequency in the second frequency band is higher than the highest frequency in the first frequency band. A frequency is a central frequency value of a frequency band in which a subcarrier or a sub-channel is located.

Further, the frequency band used by the network side device to send the downlink synchronization symbol may be a combination of frequency bands used to send the downlink synchronization symbol in two DSL modes with different frequency bands. For example, the network side device may support both a VDSL2 and a next-generation VDSL, and support a union of frequency bands used to send the downlink synchronization symbol in the two modes. A frequency band used to send the downlink synchronization symbol in the VDSL2 mode is 0 MHz to 17.664 MHz, and a frequency band used to send the downlink synchronization symbol in the next-generation VDSL mode is at least 0 MHz to 35.328 MHz. A union of the frequency bands used to send the downlink synchronization symbol in the two modes is 0 MHz to 35.328 MHz. In this case, the highest frequency in the first frequency band is not higher than a highest frequency in an overlapped frequency band used to send the downlink synchronization symbol in the two DSL modes with different frequency bands.

Optionally, a cut-off frequency in the first frequency band is not higher than a half of a cut-off frequency in the second frequency band, or a quantity of subcarriers in the first frequency band is not greater than a quantity of subcarriers in the second frequency band.

Step 203: Alternately allocate frequencies in the first frequency band to a probe tone and a flag tone; and allocate all frequencies in the second frequency band to a probe tone.

Step 205: The network side device modulates a downlink pilot sequence to probe tones in the first frequency band and the second frequency band, and sends the downlink pilot sequence to a peer device.

Further, the method further includes step 207 (not shown in the figure): The network side device receives a signal fed back by the peer device, where the signal fed back by the peer device reflects a signal received by the peer device on the probe tones in the first frequency band and the second frequency band.

More specifically, the signal fed back by the peer device is an error sample signal of the signal received by the peer device on the probe tones in the first frequency band and the second frequency band, or a signal that is obtained after frequency domain conversion is performed on the signal received on the probe tones in the first frequency band and the second frequency band.

The alternately allocating frequencies in the first frequency band to a probe tone and a flag tone specifically includes: alternately allocating, according to a comb-shaped structure, the frequencies in the first frequency band to the probe tone and the flag tone.

Figure 3:
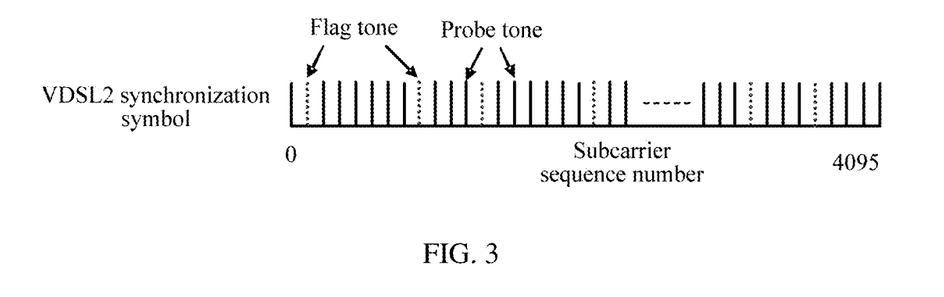
FIG. 3 is a schematic diagram of frequency allocation according to an embodiment of the present invention.

FIG. 3 shows an instance in which the frequencies in the first frequency band are alternately allocated to the probe tones and the flag tones according to a comb-shaped structure. 0 MHz to 17.664 MHz correspond to frequency channel numbers 0 to 4095. Frequencies whose sequence numbers are 10n, 10n+2, 10n+3, 10n+4, 10n+5, 10n+6, 10n+8, and 10n+9 are allocated to the probe tones, where n is a nonnegative integer. Frequencies whose sequence numbers are 10n+1 and 10n+7 are allocated to the flag tones.

Further, the network side device modulates the downlink pilot sequence to the probe tones in the first frequency band and the second frequency band and to the flag tone in the first frequency band in an initialization phase; and modulates the downlink pilot sequence to the probe tones in the first frequency band and the second frequency band in a showtime phase.

Still further, ranges of the first frequency band and the second frequency band are fixedly set in a device, or determined after the network side device interacts and negotiates with the peer device in a handshake phase or the initialization phase.

The method further includes: performing, by the network side device, precoding processing on a to-be-sent signal according to the signal fed back by the peer device.

According to this method embodiment, the network side device divides the frequency band used to send a downlink synchronization symbol into the at least two parts of frequency bands that do not overlap, and allocates, to probe tones, all high frequency bands that are prone to interference, so as to increase density of the probe tones. In this way, the downlink pilot sequence is modulated to the probe tones in the first frequency band and the second frequency band, and then sent to the peer device. This can ensure that the peer device can normally obtain a signal at each frequency in a high spectrum, so that the peer device can feed back, in high precision to the network side device, a parameter related to a received signal, and the network side device can perform high-precision crosstalk cancellation processing according to the signal fed back by the peer device.

Figure 4:
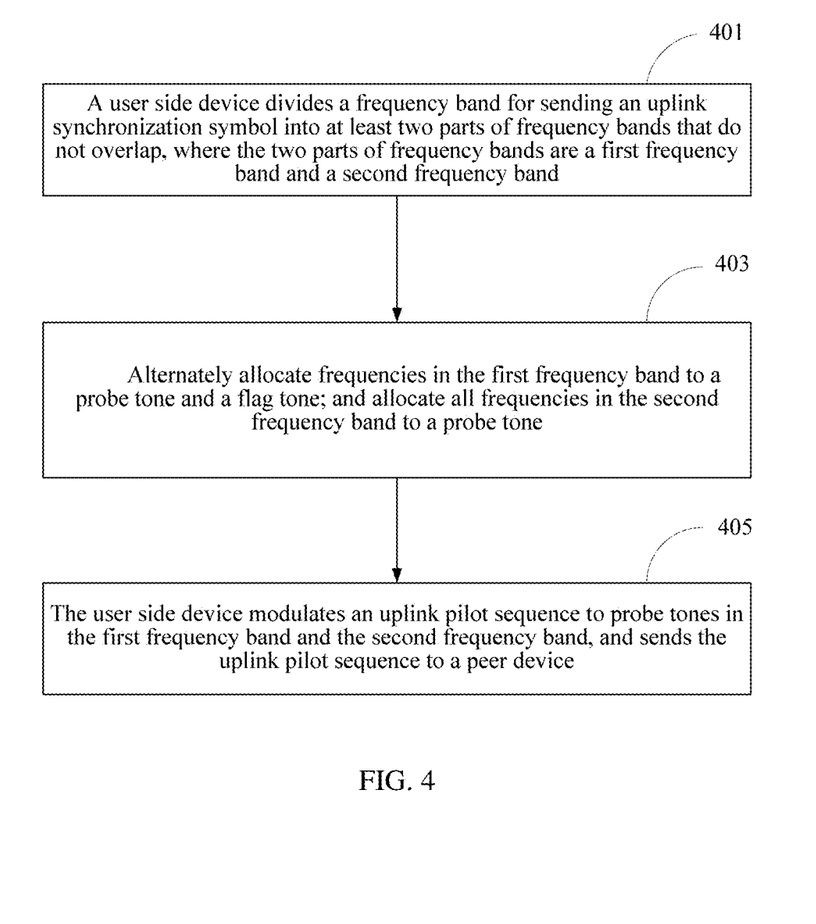
FIG. 4 is a schematic flowchart of another signal processing method according to an embodiment of the present invention.

An embodiment of the present invention provides a signal processing method. As shown in FIG. 4, the method includes the following steps.

Step 401: A user side device divides a frequency band used to send an uplink synchronization symbol into at least two parts of frequency bands that do not overlap, where the two parts of frequency bands are a first frequency band and a second frequency band, and a lowest frequency in the second frequency band is higher than a highest frequency in the first frequency band.

In an example, the frequency band used by the user side device to send the uplink synchronization symbol is 0 MHz to 35.328 MHz. 0 MHz to 35.328 MHz may be divided into two frequency bands. The highest frequency in the first frequency band is set to not higher than 17.664 MHz. The lowest frequency in the second frequency band is higher than the highest frequency in the first frequency band. A frequency is a central frequency value of a frequency band in which a subcarrier or a sub-channel is located.

Further, the frequency band used by the user side device to send the uplink synchronization symbol may be a combination of frequency bands used to send the uplink synchronization symbol in two DSL modes with different frequency bands. For example, the user side device may support both a VDSL2 and a next-generation VDSL, and support a union of frequency bands used to send the uplink synchronization symbol in the two standards. A frequency band used to send the uplink synchronization symbol in the VDSL2 mode is 0 MHz to 17.664 MHz, and a frequency band used to send the uplink synchronization symbol in the next-generation VDSL mode is at least 0 MHz to 35.328 MHz. A union of the frequency bands used to send the uplink synchronization symbol in the two modes is 0 MHz to 35.328 MHz, and an overlapped frequency band is 0 MHz to 17.664 MHz. In this case, the highest frequency in the first frequency band is not higher than a highest frequency in the overlapped frequency band used to send the uplink synchronization symbol in the two DSL modes with different frequency bands.

Optionally, a cut-off frequency in the first frequency band is not higher than a half of a cut-off frequency in the second frequency band, or a quantity of subcarriers in the first frequency band is not greater than a quantity of subcarriers in the second frequency band.

Step 403: Alternately allocate frequencies in the first frequency band to a probe tone and a flag tone; and allocate all frequencies in the second frequency band to a probe tone.

Step 405: The user side device modulates an uplink pilot sequence to probe tones in the first frequency band and the second frequency band, and sends the uplink pilot sequence to a peer device.

Further, the user side device modulates the uplink pilot sequence to the probe tones in the first frequency band and the second frequency band and to the flag tone in the first frequency band in an initialization phase; and modulates the uplink pilot sequence to the probe tones in the first frequency band and the second frequency band in a showtime phase.

Still further, ranges of the first frequency band and the second frequency band are fixedly set in a device, or determined after the user side device interacts and negotiates with the peer device in a handshake phase or the initialization phase.

According to this method embodiment, the user side device divides the frequency band used to send a downlink synchronization symbol into the at least two parts of frequency bands that do not overlap, and allocates, to probe tones, all high frequency bands that are prone to interference, so as to increase density of the probe tones. In this way, the uplink pilot sequence is modulated to the probe tones in the first frequency band and the second frequency band, and then sent to the peer device. This can ensure that the peer device can normally obtain a signal at each frequency in a high spectrum, so that the peer device can perform high-precision crosstalk cancellation processing according to the received signal.

Figure 5:
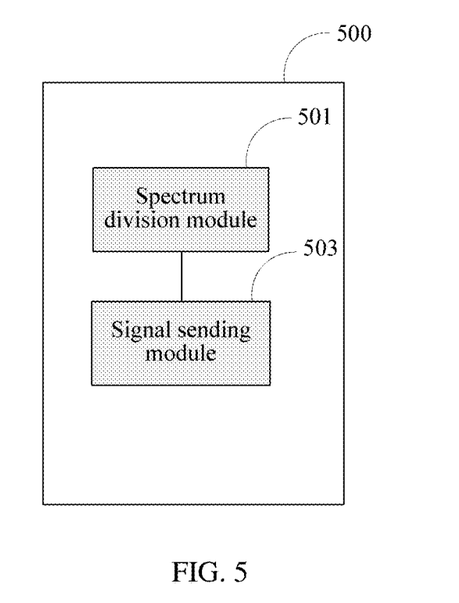
FIG. 5 is a schematic structural diagram of a network side device according to an embodiment of the present invention.

An embodiment of the present invention further provides a network side device 500. As shown in FIG. 5, the network side device 500 includes a spectrum division module 501 and a signal sending module 503.

The spectrum division module 501 is configured to: divide a frequency band used to send a downlink synchronization symbol into at least two parts of frequency bands that do not overlap, where the two parts of frequency bands are a first frequency band and a second frequency band, and a lowest frequency in the second frequency band is higher than a highest frequency in the first frequency band; and alternately allocate frequencies in the first frequency band to a probe tone and a flag tone; and allocate all frequencies in the second frequency band to a probe tone.

The signal sending module 503 is configured to: modulate, by the network side device, a downlink pilot sequence to probe tones in the first frequency band and the second frequency band, and send the downlink pilot sequence to a peer device.

Further, the frequency band used by the network side device to send the downlink synchronization symbol may be a combination of frequency bands used to send the downlink synchronization symbol in two DSL modes with different frequency bands; and the highest frequency in the first frequency band is not higher than a highest frequency in an overlapped frequency band used to send the downlink synchronization symbol in the two DSL modes with different frequency bands.

Further, the network side device 500 further includes a signal receiving module 505 (not shown in the figure), configured to receive a signal fed back by the peer device, where the signal fed back by the peer device reflects a signal received by the peer device on the probe tones in the first frequency band and the second frequency band.

Further, that the spectrum division module 501 alternately allocates the frequencies in the first frequency band to the probe tone and the flag tone specifically includes that: the spectrum division module 501 alternately allocates, according to a comb-shaped structure, the frequencies in the first frequency band to the probe tone and the flag tone.

Further, the signal sending module 503 modulates the downlink pilot sequence to the probe tones in the first frequency band and the second frequency band and to the flag tone in the first frequency band in an initialization phase; and modulates the downlink pilot sequence to the probe tones in the first frequency band and the second frequency band in a showtime phase.

Further, the network side device 500 is a DSLAM, the spectrum division module 501 is a processing chip in the DSLAM, and the signal sending module 503 is a signal transmitter in the DSLAM. Further, the signal receiving module 505 is a signal receiver in the DSLAM.

It should also be noted that specific actions performed by the modules in the network side device 500 are the methods in the foregoing method embodiments. Effects achieved by the actions and the methods are the same, and specific content is not described again.

Figure 6:
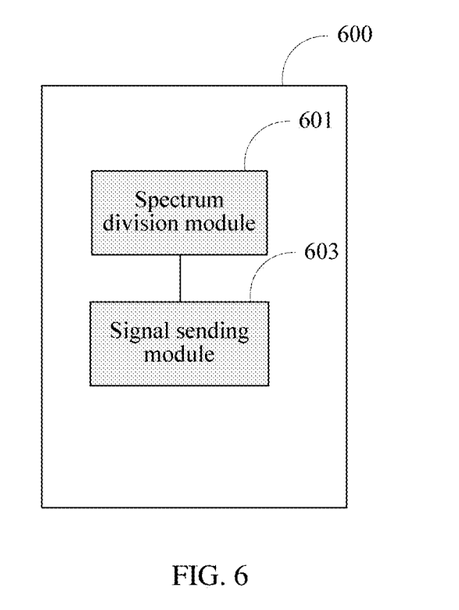
FIG. 6 is a schematic structural diagram of a user side device according to an embodiment of the present invention.

An embodiment of the present invention further provides a user side device 600. As shown in FIG. 6, the user side device 600 includes a spectrum division module 601 and a signal sending module 603.

The spectrum division module 601 is configured to: divide a frequency band used to send an uplink synchronization symbol into at least two parts of frequency bands that do not overlap, where the two parts of frequency bands are a first frequency band and a second frequency band, and a lowest frequency in the second frequency band is higher than a highest frequency in the first frequency band; and alternately allocate frequencies in the first frequency band to a probe tone and a flag tone; and allocate all frequencies in the second frequency band to a probe tone.

The signal sending module 603 is configured to: modulate an uplink pilot sequence to probe tones in the first frequency band and the second frequency band, and send the uplink pilot sequence to a peer device.

Further, the frequency band used by the user side device to send the uplink synchronization symbol may be a combination of frequency bands used to send the uplink synchronization symbol in two DSL modes with different frequency bands; and the highest frequency in the first frequency band is not higher than a highest frequency in an overlapped frequency band used to send the uplink synchronization symbol in the two DSL modes with different frequency bands.

Further, the signal sending module 603 modulates the uplink pilot sequence to the probe tones in the first frequency band and the second frequency band and to the flag tone in the first frequency band in an initialization phase; and modulates the uplink pilot sequence to the probe tones in the first frequency band and the second frequency band in a showtime phase.

Further, the user side device 600 is CPE, the spectrum division module 601 is a processing chip in the CPE, and the signal sending module 603 is a signal transmitter in the CPE.

It should also be noted that specific actions performed by the modules in the user side device 600 are the methods in the foregoing method embodiments. Effects achieved by the actions and the methods are the same, and specific content is not described again.

Figure 7:
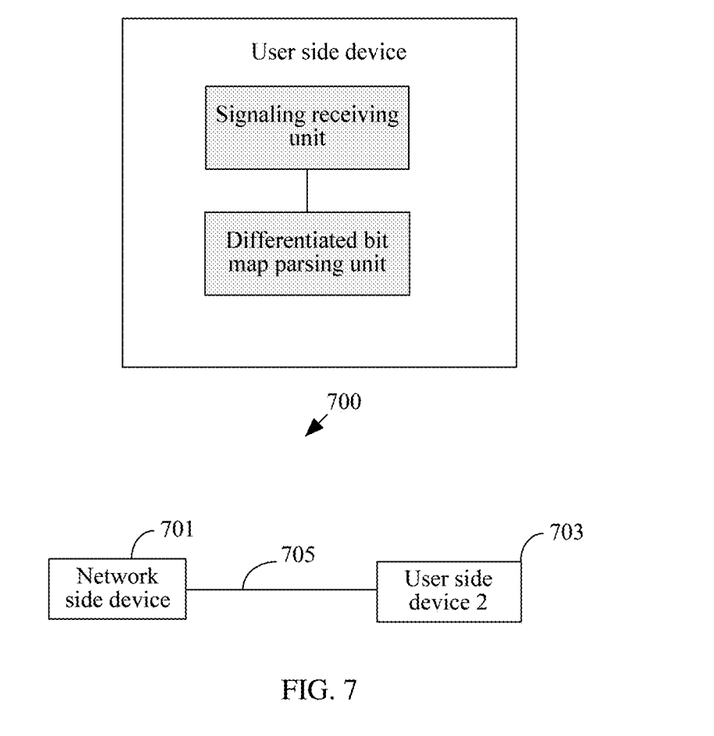
FIG. 7 is a schematic structural diagram of a system according to an embodiment of the present invention.

An embodiment of the present invention further provides a network system 700, including a network side device 701 and a user side device 703. As shown in FIG. 7, the network side device 701 and the user side device 703 are connected by using a twisted pair 705.

The network side device 701 is the network side device 500 in the foregoing embodiment; or the user side device 703 is the user side device 600 in the foregoing embodiment.

It should be further noted that specific actions performed by the network side device or the user side device are methods in the foregoing method embodiments, and specific steps are not described again.

Figure 8:
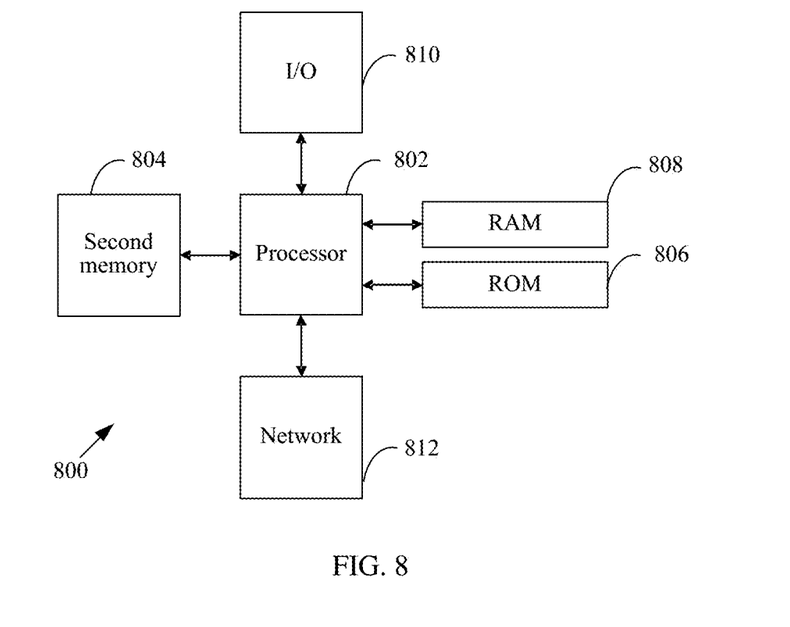
FIG. 8 is a schematic diagram of a general network component according to an embodiment of the present invention.

Persons of ordinary skill in the art may understand that all or some of the steps of the foregoing method embodiments may be implemented by a program instructing relevant hardware. The program may be stored in a computer readable storage medium. When the program runs, the steps of the foregoing method embodiments are performed. The storage medium includes: any medium that can store program code, such as a ROM, a RAM, a magnetic disk, or an optical disc. Specifically, the foregoing network processing process may be implemented on a general component of, for example, a computer or a network component that has sufficient processing capabilities, memory resources, and network throughput capabilities. FIG. 8 shows an example of an electrical general network component 800 applicable to implementing one or more embodiments of components disclosed in this specification. The network component 800 includes a processor 802 (which may be referred to as a central processing unit or a CPU). The processor 802 communicates with a memory device including a second memory 804, a read-only memory (ROM) 806, a random access memory (RAM) 808, an input/output (I/O) device 810, and a network-attached device 812. The processor 802 may be implemented as one or more CPU chips, or implemented as a part of one or more application-specific integrated circuits.

The second memory 804 typically includes one or more disk drives or disc drives and is used for non-volatile storage of data. In addition, if the RAM 808 is insufficient to store all operation data, the second memory 804 is used as a memory device for overflowed data. The second memory 804 may be configured to store programs that are loaded on the RAM 808 when the programs are selected for execution. The ROM 806 is configured to store an instruction or data that is read when the programs are executed. The ROM 806 is a non-volatile memory device and typically has a smaller storage capacity compared with a relatively large storage capacity of the second memory 804. The RAM 808 is configured to store volatile data and may store an instruction. Usually, access to the ROM 806 and the RAM 808 is faster than access to the second memory 804.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method comprising:
dividing, by a network side device, a frequency band to be used to send a downlink synchronization symbol on a digital subscriber line (DSL) into at least two parts of frequency bands that do not overlap, wherein the at least two parts of frequency bands comprise a first frequency band and a second frequency band, and the frequency band is divided such that the first frequency band falls within a third frequency band of a first DSL mode configured for transmitting downlink synchronization symbols and the second frequency band falls within a fourth frequency band of a second DSL mode configured for transmitting downlink synchronization symbols, the third frequency band of the first DSL mode different than the fourth frequency band of the second DSL mode, the third frequency band of the first DSL mode partially overlapping the fourth frequency band of the second DSL mode, and a lowest frequency in the second frequency band being higher than a highest frequency in the first frequency band; and
after dividing the frequency band,
alternately allocating, by the network side device, frequencies in the first frequency band to a first probe tone and a flag tone;
allocating, by the network side device, all frequencies in the second frequency band to a second probe tone;
modulating, by the network side device, a downlink pilot sequence to probe tones in the first frequency band and the second frequency band; and
sending, by the network side device, the downlink pilot sequence to a peer device in the first frequency band and the second frequency band on the DSL.

2. The method according to claim 1, wherein alternately allocating frequencies in the first frequency band to the first probe tone and the flag tone comprises alternately allocating, according to a comb-shaped structure, the frequencies in the first frequency band to the first probe tone and the flag tone.

3. The method according to claim 1, wherein a cut-off frequency in the first frequency band is not higher than a half of a cut-off frequency in the second frequency band, or a quantity of subcarriers in the first frequency band is not greater than a quantity of subcarriers in the second frequency band.

4. The method according to claim 1,
wherein the frequency band to be used by the network side device to send the downlink synchronization symbol is a combination of the third and fourth frequency bands, and
wherein the highest frequency in the first frequency band is not higher than a highest frequency in an overlapped frequency band of the third and fourth frequency bands used to send the downlink synchronization symbol in the first and second DSL modes.

5. The method according to claim 1, further comprising:
modulating, by the network side device, the downlink pilot sequence to the probe tones in the first frequency band and the second frequency band and to the flag tone in the first frequency band in an initialization phase; and
modulating, by the network side device, the downlink pilot sequence to the probe tones in the first frequency band and the second frequency band in a data transmission phase.

6. The method according to claim 5, wherein ranges of the first frequency band and the second frequency band are fixedly set in the peer device, or determined after the network side device interacts and negotiates with the peer device in a handshake phase or the initialization phase.

7. The method according to claim 1, further comprising receiving, by the network side device, a signal fed back by the peer device, wherein the signal fed back by the peer device reflects a signal received by the peer device on the probe tones in the first frequency band and the second frequency band.

8. The method according to claim 7, wherein the signal fed back by the peer device is an error sample signal of the signal received by the peer device on the probe tones in the first frequency band and the second frequency band, or a signal that is obtained after frequency domain conversion is performed on the signal received on the probe tones in the first frequency band and the second frequency band.

9. A method comprising:
dividing, by a user side device, a frequency band to be used to send an uplink synchronization symbol on a digital subscriber line (DSL) into at least two parts of frequency bands that do not overlap, wherein the at least two parts of frequency bands comprise a first frequency band and a second frequency band, and the frequency band is divided such that the first frequency band falls within a third frequency band of a first DSL mode configured for transmitting downlink synchronization symbols and the second frequency band falls within a fourth frequency band of a second DSL mode configured for transmitting downlink synchronization symbols, the third frequency band of the first DSL mode different than the fourth frequency band of the second DSL mode, the third frequency band of the first DSL mode partially overlapping the fourth frequency band of the second DSL mode, and a lowest frequency in the second frequency band being higher than a highest frequency in the first frequency band; and
after dividing the frequency band,
alternately allocating, by the user side device, frequencies in the first frequency band to a first probe tone and a flag tone;
allocating, by the user side device, all frequencies in the second frequency band to a second probe tone;
modulating, by the user side device, an uplink pilot sequence to probe tones in the first frequency band and the second frequency band; and
sending, by the user side device, the uplink pilot sequence in the first frequency band and the second frequency band on the DSL to a peer device.

10. The method according to claim 9,
wherein the frequency band to be used by the user side device to send the uplink synchronization symbol is a combination of the third and fourth frequency bands, and
wherein the highest frequency in the first frequency band is not higher than a highest frequency in an overlapped frequency band of the third and fourth frequency bands used to send the uplink synchronization symbol in the first and second DSL modes.

11. The method according to claim 10, wherein the user side device modulates the uplink pilot sequence to the probe tones in the first frequency band and the second frequency band and to the flag tone in the first frequency band in an initialization phase; and modulates the uplink pilot sequence to the probe tones in the first frequency band and the second frequency band in a data transmission phase.

12. A network side device comprising:
a processor;
a signal transmitter; and
a non-transitory computer-readable memory coupled to the processor and storing program instructions which, when executed by the processor, cause the processor to:
divide a frequency band to be used to send a downlink synchronization symbol on a digital subscriber line (DSL) into at least two parts of frequency bands that do not overlap, wherein the at least two parts of frequency bands comprise a first frequency band and a second frequency band, and the frequency band is divided such that the first frequency band falls within a third frequency band of a first DSL mode configured for transmitting downlink synchronization symbols and the second frequency band falls within a fourth frequency band of a second DSL mode configured for transmitting downlink synchronization symbols, the third frequency band of the first DSL mode different than the fourth frequency band of the second DSL mode, the third frequency band of the first DSL mode partially overlapping the fourth frequency band of the second DSL mode, and a lowest frequency in the second frequency band being higher than a highest frequency in the first frequency band; and
after dividing the frequency band,
alternately allocate frequencies in the first frequency band to a first probe tone and a flag tone; and
allocate all frequencies in the second frequency band to a second probe tone, and
wherein the signal transmitter is configured to modulate a downlink pilot sequence to probe tones in the first frequency band and the second frequency band, and send the downlink pilot sequence to a peer device in the first frequency band and the second frequency band on the DSL.

13. The network side device according to claim 12,
wherein the frequency band to be used to send the downlink synchronization symbol is a combination of the third and fourth frequency bands used to, and
wherein the highest frequency in the first frequency band is not higher than a highest frequency in an overlapped frequency band of the third and fourth frequency bands used to send the downlink synchronization symbol in the first and second DSL modes.

14. The network side device according to claim 12, wherein the program instructions to alternately allocate the frequencies in the first frequency band to the first probe tone and the flag tone comprises instructions to alternately allocating, according to a comb-shaped structure, the frequencies in the first frequency band to the first probe tone and the flag tone.

15. The network side device according to claim 12, wherein the signal transmitter is further configured to:
modulate the downlink pilot sequence to the probe tones in the first frequency band and the second frequency band and to the flag tone in the first frequency band in an initialization phase; and modulate the downlink pilot sequence to the probe tones in the first frequency band and the second frequency band in a data transmission phase.

16. The network side device according to claim 12, wherein the network side device is a DSL access multiplexer (DSLAM).

17. A user side device comprising:
a processor;
a signal transmitter; and
a non-transitory computer-readable memory coupled to the processor and storing program instructions which, when executed by the processor, cause the processor to:
divide a frequency band to be used to send an uplink synchronization symbol on a digital subscriber line (DSL) into at least two parts of frequency bands that do not overlap, wherein the at least two parts of frequency bands are a first frequency band and a second frequency band, and the frequency band is divided such that the first frequency band falls within a third frequency band of a first DSL mode configured for transmitting downlink synchronization symbols and the second frequency band falls within a fourth frequency band of a second DSL mode configured for transmitting downlink synchronization symbols, the third frequency band of the first DSL mode different than the fourth frequency band of the second DSL mode, the third frequency band of the first DSL mode partially overlapping the fourth frequency band of the second DSL mode, and a lowest frequency in the second frequency band higher than a highest frequency in the first frequency band; and
after dividing the frequency band,
alternately allocate frequencies in the first frequency band to a first probe tone and a flag tone; and
allocate all frequencies in the second frequency band to a second probe tone, and
wherein the signal transmitter is configured to modulate an uplink pilot sequence to probe tones in the first frequency band and the second frequency band, and send the uplink pilot sequence to a peer device in the first frequency band and the second frequency band on the DSL.

18. The user side device according to claim 17,
wherein the frequency band to be used to send the uplink synchronization symbol is a combination of the third and fourth frequency bands, and
wherein the highest frequency in the first frequency band is not higher than a highest frequency in an overlapped frequency band of the third and fourth frequency bands used to send the uplink synchronization symbol in the first and second DSL modes.

19. The user side device according to claim 17, wherein the signal transmitter is configured to
modulate the uplink pilot sequence to the probe tones in the first frequency band and the second frequency band and to the flag tone in the first frequency band in an initialization phase; and
modulate the uplink pilot sequence to the probe tones in the first frequency band and the second frequency band in a data transmission phase.

20. The user side device according to claim 17, wherein the user side device is customer premises equipment (CPE).

* * * * *

UNITED STATES PATENT AND TRADEMARK OFFICE
CERTIFICATE OF CORRECTION

PATENT NO.          : 11,095,407 B2                                              Page 1 of 1
APPLICATION NO.     : 15/813426
DATED               : August 17, 2021
INVENTOR(S)         : Fanglin Sun It is certified that error appears in the above-identified patent and that said Letters Patent is hereby corrected as shown below:

On the Title Page

Item (73), Assignee; delete "Lid" and insert --Ltd--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*